(12) United States Patent
Bushey et al.

(10) Patent No.: US 8,879,714 B2
(45) Date of Patent: *Nov. 4, 2014

(54) SYSTEM AND METHOD OF DETERMINING CALL TREATMENT OF REPEAT CALLS

(75) Inventors: Robert R. Bushey, Cedar Park, TX (US); Benjamin Anthony Knott, Round Rock, TX (US); Sarah Korth, Chicago, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 10 days.

This patent is subject to a terminal disclaimer.

(21) Appl. No.: 13/618,819

(22) Filed: Sep. 14, 2012

(65) Prior Publication Data

US 2013/0010947 A1 Jan. 10, 2013

Related U.S. Application Data

(63) Continuation of application No. 12/616,248, filed on Nov. 11, 2009, now Pat. No. 8,295,469, which is a continuation of application No. 11/129,051, filed on May 13, 2005, now Pat. No. 7,636,432.

(51) Int. Cl.
| | |
|---|---|
| *H04M 3/00* | (2006.01) |
| *H04L 12/00* | (2006.01) |
| *G06F 13/00* | (2006.01) |
| *G06Q 20/40* | (2012.01) |
| *G06Q 20/10* | (2012.01) |
| *H04M 3/523* | (2006.01) |

(52) U.S. Cl.
CPC ............ *H04M 3/5235* (2013.01); *G06Q 20/40* (2013.01); *G06Q 20/10* (2013.01); *H04M 3/5232* (2013.01); *H04M 2203/551* (2013.01)

USPC ................. 379/265.02; 370/232; 379/93.01; 379/265.11; 710/100

(58) Field of Classification Search
CPC ..................... H04M 2203/551; H04M 3/5232
USPC ............... 370/356, 232; 379/45, 67.1, 88.18, 379/88.19, 88.23, 112.06, 114.28, 120, 379/127.01, 188, 201.01, 219, 221.01, 379/221.02, 221.08, 221.09, 243, 265.02, 379/265.09, 265.13, 266.01, 266.1, 372, 93, 379/265.11; 455/412.2; 707/500.1; 710/100; 704/244

See application file for complete search history.

(56) References Cited

U.S. PATENT DOCUMENTS

| | | | |
|---|---|---|---|
| 3,811,012 A | | 5/1974 | Barber |
| 4,555,594 A | * | 11/1985 | Friedes et al. ............ 379/221.02 |
| 4,565,903 A | * | 1/1986 | Riley ........................ 379/221.02 |
| 4,577,066 A | * | 3/1986 | Bimonte et al. ............... 379/243 |
| 4,760,593 A | | 7/1988 | Shapiro et al. |
| 4,922,221 A | | 5/1990 | Sato et al. |
| 4,953,204 A | | 8/1990 | Cuschleg, Jr. et al. |
| 4,967,405 A | | 10/1990 | Upp et al. |

(Continued)

*Primary Examiner* — Gerald Gauthier
(74) *Attorney, Agent, or Firm* — Toler Law Group, PC

(57) ABSTRACT

A method is disclosed that includes retrieving first data associated with a call from an action-object table. The method further includes retrieving second data from a resolution table based on the first data. The second data indicates a treatment type to be provided to the call. The method further includes, in response to determining that the treatment type indicates a particular treatment type, servicing the call with the particular treatment type. The particular treatment type includes routing the call to a destination associated with a call center.

20 Claims, 4 Drawing Sheets

(56) References Cited

U.S. PATENT DOCUMENTS

| | | | |
|---|---|---|---|
| 5,043,718 A | 8/1991 | Shimura | |
| 5,049,874 A | 9/1991 | Ishida et al. | |
| 5,093,659 A | 3/1992 | Yamada | |
| 5,206,899 A * | 4/1993 | Gupta et al. | 379/120 |
| 5,241,678 A | 8/1993 | Futamura et al. | |
| 5,247,564 A | 9/1993 | Zicker | |
| 5,309,509 A | 5/1994 | Cocklin et al. | |
| 5,335,269 A | 8/1994 | Steinlicht | |
| 5,357,564 A * | 10/1994 | Gupta et al. | 379/188 |
| 5,455,903 A | 10/1995 | Jolissaint et al. | |
| 5,473,677 A * | 12/1995 | D'Amato et al. | 379/114.28 |
| 5,497,373 A | 3/1996 | Hulen et al. | |
| 5,509,055 A | 4/1996 | Ehrlich et al. | |
| 5,521,965 A | 5/1996 | D'Allessio et al. | |
| 5,522,046 A | 5/1996 | McMillen et al. | |
| 5,530,744 A | 6/1996 | Charalambous et al. | |
| 5,555,299 A | 9/1996 | Maloney et al. | |
| 5,559,860 A | 9/1996 | Mizikovsky | |
| 5,590,186 A | 12/1996 | Liao et al. | |
| 5,594,791 A | 1/1997 | Szlam et al. | |
| 5,598,460 A | 1/1997 | Tendler | |
| 5,652,789 A | 7/1997 | Miner et al. | |
| 5,657,383 A * | 8/1997 | Gerber et al. | 379/266.01 |
| 5,737,703 A | 4/1998 | Byrne | |
| 5,754,639 A | 5/1998 | Flockhart et al. | |
| 5,754,978 A | 5/1998 | Perez-Mendez et al. | |
| 5,787,360 A | 7/1998 | Johnston et al. | |
| 5,923,744 A * | 7/1999 | Cheng | 379/221.09 |
| 5,923,745 A | 7/1999 | Hurd | |
| 5,940,476 A | 8/1999 | Morganstein et al. | |
| 5,946,388 A | 8/1999 | Walker et al. | |
| 5,953,704 A | 9/1999 | McIlroy et al. | |
| 5,978,463 A | 11/1999 | Jurkevics et al. | |
| 5,999,965 A | 12/1999 | Kelly | |
| 6,002,689 A | 12/1999 | Christie et al. | |
| 6,002,760 A | 12/1999 | Gisby | |
| 6,003,011 A | 12/1999 | Sarin et al. | |
| 6,049,594 A | 4/2000 | Furman et al. | |
| 6,118,866 A | 9/2000 | Shtivelmann | |
| 6,119,101 A | 9/2000 | Peckover | |
| 6,173,266 B1 | 1/2001 | Marx et al. | |
| 6,173,289 B1 | 1/2001 | Sonderegger et al. | |
| 6,173,399 B1 | 1/2001 | Gilbrech | |
| 6,175,621 B1 | 1/2001 | Begeja | |
| 6,240,181 B1 | 5/2001 | Tunstall | |
| 6,259,786 B1 | 7/2001 | Gisby | |
| 6,263,071 B1 * | 7/2001 | Swan et al. | 379/372 |
| 6,269,153 B1 | 7/2001 | Carpenter et al. | |
| 6,317,439 B1 | 11/2001 | Cardona et al. | |
| 6,317,884 B1 | 11/2001 | Eames et al. | |
| 6,333,980 B1 | 12/2001 | Hollatz et al. | |
| 6,353,608 B1 | 3/2002 | Cullers et al. | |
| 6,366,658 B1 | 4/2002 | Bjornberg et al. | |
| 6,366,668 B1 | 4/2002 | Borst et al. | |
| 6,381,329 B1 | 4/2002 | Uppaluru et al. | |
| 6,385,584 B1 | 5/2002 | McAllister et al. | |
| 6,389,400 B1 | 5/2002 | Bushey et al. | |
| 6,400,804 B1 | 6/2002 | Bilder | |
| 6,400,996 B1 | 6/2002 | Hoffberg et al. | |
| 6,405,159 B2 | 6/2002 | Bushey et al. | |
| 6,411,692 B1 * | 6/2002 | Scherer | 379/127.01 |
| 6,414,966 B1 | 7/2002 | Kulkarni et al. | |
| 6,418,424 B1 | 7/2002 | Hoffberg et al. | |
| 6,442,247 B1 | 8/2002 | Garcia | |
| 6,483,897 B1 | 11/2002 | Millrod | |
| 6,501,753 B1 * | 12/2002 | Lin et al. | 370/356 |
| 6,510,414 B1 | 1/2003 | Chaves | |
| 6,519,562 B1 | 2/2003 | Phillips et al. | |
| 6,522,742 B1 * | 2/2003 | Crosby et al. | 379/219 |
| 6,529,871 B1 | 3/2003 | Kanevsky et al. | |
| 6,535,596 B1 * | 3/2003 | Frey et al. | 379/201.01 |
| 6,553,112 B2 | 4/2003 | Ishikawa | |
| 6,556,671 B1 | 4/2003 | Beauvois | |
| 6,570,967 B2 | 5/2003 | Katz | |
| 6,584,180 B2 | 6/2003 | Nemoto | |
| 6,587,556 B1 | 7/2003 | Judkins et al. | |
| 6,597,783 B1 * | 7/2003 | Tada et al. | 379/265.09 |
| 6,598,136 B1 | 7/2003 | Norrod et al. | |
| 6,600,736 B1 | 7/2003 | Ball et al. | |
| 6,601,014 B1 | 7/2003 | Dempsey | |
| 6,603,854 B1 | 8/2003 | Judkins et al. | |
| 6,614,781 B1 | 9/2003 | Elliot et al. | |
| 6,631,186 B1 | 10/2003 | Adams et al. | |
| 6,654,602 B1 | 11/2003 | Fye et al. | |
| 6,678,360 B1 | 1/2004 | Katz | |
| 6,678,718 B1 | 1/2004 | Khouri et al. | |
| 6,680,935 B1 | 1/2004 | Kung et al. | |
| 6,690,788 B1 | 2/2004 | Bauer et al. | |
| 6,694,012 B1 | 2/2004 | Posthuma | |
| 6,697,460 B2 | 2/2004 | Knott et al. | |
| 6,700,972 B1 | 3/2004 | McHugh et al. | |
| 6,704,404 B1 | 3/2004 | Burnett | |
| 6,707,789 B1 | 3/2004 | Arslan et al. | |
| 6,714,631 B1 | 3/2004 | Martin et al. | |
| 6,721,416 B1 | 4/2004 | Farrell | |
| 6,731,722 B2 | 5/2004 | Coffey | |
| 6,738,473 B1 | 5/2004 | Burg et al. | |
| 6,744,861 B1 | 6/2004 | Pershan et al. | |
| 6,744,877 B1 | 6/2004 | Edwards | |
| 6,751,306 B2 | 6/2004 | Himmel et al. | |
| 6,757,306 B1 | 6/2004 | Klish, II et al. | |
| 6,766,320 B1 | 7/2004 | Wang et al. | |
| 6,775,359 B1 | 8/2004 | Ron et al. | |
| 6,778,643 B1 | 8/2004 | Bushey et al. | |
| 6,792,096 B2 | 9/2004 | Martin et al. | |
| 6,798,768 B1 | 9/2004 | Gallick et al. | |
| 6,807,274 B2 | 10/2004 | Joseph et al. | |
| 6,823,307 B1 | 11/2004 | Steinbiss et al. | |
| 6,826,264 B2 | 11/2004 | Valco | |
| 6,831,932 B1 | 12/2004 | Boyle et al. | |
| 6,832,224 B2 | 12/2004 | Gilmour | |
| 6,842,504 B2 | 1/2005 | Mills et al. | |
| 6,847,711 B2 | 1/2005 | Knott et al. | |
| 6,853,722 B2 | 2/2005 | Joseph et al. | |
| 6,853,966 B2 | 2/2005 | Bushey et al. | |
| 6,859,529 B2 | 2/2005 | Duncan et al. | |
| 6,871,212 B2 | 3/2005 | Khouri et al. | |
| 6,879,683 B1 | 4/2005 | Fain et al. | |
| 6,882,641 B1 | 4/2005 | Gallick et al. | |
| 6,885,734 B1 | 4/2005 | Eberle et al. | |
| 6,891,932 B2 | 5/2005 | Bhargava et al. | |
| 6,895,083 B1 | 5/2005 | Bers et al. | |
| 6,901,366 B1 | 5/2005 | Kuhn et al. | |
| 6,907,119 B2 | 6/2005 | Case et al. | |
| 6,914,974 B2 | 7/2005 | Bonnin | |
| 6,915,246 B2 | 7/2005 | Gusler et al. | |
| 6,963,983 B2 | 11/2005 | Munson et al. | |
| 7,006,605 B1 | 2/2006 | Morganstein et al. | |
| 7,006,607 B2 * | 2/2006 | Garcia | 379/88.18 |
| 7,020,256 B2 | 3/2006 | Jain et al. | |
| 7,031,444 B2 | 4/2006 | Shen et al. | |
| 7,035,388 B2 | 4/2006 | Kurosaki et al. | |
| 7,072,643 B2 | 7/2006 | Pines et al. | |
| 7,072,659 B2 | 7/2006 | White, Jr. | |
| 7,102,780 B2 | 9/2006 | Watanabe | |
| 7,149,525 B2 | 12/2006 | White, Jr. | |
| 7,177,397 B2 * | 2/2007 | McCalmont et al. | 379/45 |
| 7,215,745 B2 * | 5/2007 | Peters | 379/88.23 |
| 7,224,792 B2 | 5/2007 | Fusco | |
| 7,242,751 B2 | 7/2007 | Bushey et al. | |
| 7,260,537 B2 | 8/2007 | Creamer et al. | |
| 7,277,922 B1 | 10/2007 | Contractor | |
| 7,313,229 B1 | 12/2007 | Sherwood | |
| 7,349,843 B1 | 3/2008 | Beck | |
| 7,443,963 B2 * | 10/2008 | Scherer | 379/88.19 |
| 7,450,698 B2 | 11/2008 | Bushey et al. | |
| 7,545,925 B2 * | 6/2009 | Williams | 379/265.13 |
| 7,551,723 B2 | 6/2009 | Mills | |
| 7,573,990 B2 * | 8/2009 | Galvin | 379/112.06 |
| 7,580,837 B2 | 8/2009 | Bushey et al. | |
| 7,602,898 B2 | 10/2009 | Klein et al. | |
| 7,616,944 B2 * | 11/2009 | Gustavsson et al. | 455/412.2 |
| 7,620,168 B2 * | 11/2009 | Ekstrom | 379/221.08 |
| 7,627,096 B2 | 12/2009 | Bushey et al. | |

(56) References Cited

U.S. PATENT DOCUMENTS

| | | |
|---|---|---|
| 7,627,109 B2 | 12/2009 | Mitra |
| 7,636,432 B2 * | 12/2009 | Bushey et al. ............ 379/265.02 |
| 7,647,582 B2 | 1/2010 | Krishnaswamy et al. |
| 7,657,005 B2 | 2/2010 | Chang |
| 7,668,889 B2 | 2/2010 | Edwards et al. |
| 7,702,532 B2 | 4/2010 | Vigil |
| 7,724,889 B2 | 5/2010 | Bushey et al. |
| 7,739,717 B1 | 6/2010 | Kuether et al. |
| 7,751,551 B2 | 7/2010 | Bushey et al. |
| RE41,608 E | 8/2010 | Blair et al. |
| 7,864,942 B2 * | 1/2011 | Knott et al. .............. 379/221.01 |
| 7,900,542 B2 | 3/2011 | Kapolnek |
| 7,933,399 B2 | 4/2011 | Knott et al. |
| 7,936,861 B2 | 5/2011 | Knott et al. |
| 8,005,204 B2 | 8/2011 | Bushey et al. |
| 8,051,086 B2 | 11/2011 | Jeffs et al. |
| 8,090,086 B2 * | 1/2012 | Chang ........................ 379/88.18 |
| 8,090,091 B2 * | 1/2012 | Ekstrom .................. 379/221.08 |
| 8,139,727 B2 | 3/2012 | Awad et al. |
| 8,165,281 B2 | 4/2012 | Joseph et al. |
| 8,170,197 B2 * | 5/2012 | Odinak ...................... 379/266.1 |
| 8,175,253 B2 | 5/2012 | Knott et al. |
| 8,223,954 B2 | 7/2012 | Dallessandro et al. |
| 8,295,469 B2 * | 10/2012 | Bushey et al. ............ 379/265.02 |
| 2001/0011211 A1 | 8/2001 | Bushey et al. |
| 2001/0018672 A1 | 8/2001 | Petters et al. |
| 2001/0021948 A1 | 9/2001 | Khouri et al. |
| 2001/0032229 A1 | 10/2001 | Hulls et al. |
| 2001/0034662 A1 | 10/2001 | Morris |
| 2002/0046030 A1 | 4/2002 | Haritsa et al. |
| 2002/0057678 A1 | 5/2002 | Jiang et al. |
| 2002/0059164 A1 | 5/2002 | Shtivelman |
| 2002/0059169 A1 | 5/2002 | Quarterman et al. |
| 2002/0067714 A1 | 6/2002 | Crain et al. |
| 2002/0067820 A1 | 6/2002 | Benson et al. |
| 2002/0073434 A1 | 6/2002 | Pience |
| 2002/0080025 A1 | 6/2002 | Beattie |
| 2002/0087385 A1 | 7/2002 | Vincent |
| 2002/0114432 A1 | 8/2002 | Shaffer et al. |
| 2002/0133394 A1 | 9/2002 | Bushey et al. |
| 2002/0133413 A1 | 9/2002 | Chang et al. |
| 2002/0135618 A1 | 9/2002 | Maes et al. |
| 2002/0156699 A1 | 10/2002 | Gray et al. |
| 2002/0165732 A1 | 11/2002 | Ezzeddine et al. |
| 2002/0196277 A1 | 12/2002 | Bushey et al. |
| 2002/0198967 A1 | 12/2002 | Iwanojko et al. |
| 2003/0026409 A1 | 2/2003 | Bushey et al. |
| 2003/0035381 A1 | 2/2003 | Chen et al. |
| 2003/0035516 A1 | 2/2003 | Guedalia |
| 2003/0069937 A1 | 4/2003 | Khouri et al. |
| 2003/0097428 A1 | 5/2003 | Afkhami et al. |
| 2003/0103619 A1 | 6/2003 | Brown et al. |
| 2003/0114105 A1 | 6/2003 | Haller et al. |
| 2003/0130864 A1 | 7/2003 | Ho et al. |
| 2003/0143981 A1 | 7/2003 | Kortum et al. |
| 2003/0144846 A1 | 7/2003 | Denenberg et al. |
| 2003/0144919 A1 | 7/2003 | Trompette et al. |
| 2003/0156133 A1 | 8/2003 | Martin et al. |
| 2003/0165223 A1 | 9/2003 | Timmons et al. |
| 2003/0187732 A1 | 10/2003 | Seta |
| 2003/0187773 A1 | 10/2003 | Santos et al. |
| 2003/0194063 A1 | 10/2003 | Martin et al. |
| 2003/0195753 A1 | 10/2003 | Homuth et al. |
| 2003/0200298 A1 | 10/2003 | Su et al. |
| 2003/0202640 A1 | 10/2003 | Knott et al. |
| 2003/0202643 A1 | 10/2003 | Joseph et al. |
| 2003/0202649 A1 | 10/2003 | Haug, Jr. et al. |
| 2003/0204435 A1 | 10/2003 | McQuilkin et al. |
| 2003/0235287 A1 | 12/2003 | Margolis et al. |
| 2004/0005047 A1 | 1/2004 | Joseph et al. |
| 2004/0006473 A1 | 1/2004 | Mills et al. |
| 2004/0032862 A1 | 2/2004 | Schoeneberger et al. |
| 2004/0032935 A1 | 2/2004 | Mills et al. |
| 2004/0037401 A1 | 2/2004 | Dow et al. |
| 2004/0042592 A1 | 3/2004 | Knott et al. |
| 2004/0044950 A1 | 3/2004 | Mills et al. |
| 2004/0066401 A1 | 4/2004 | Bushey et al. |
| 2004/0066416 A1 | 4/2004 | Knott et al. |
| 2004/0073569 A1 | 4/2004 | Knott et al. |
| 2004/0083479 A1 | 4/2004 | Bondarenko et al. |
| 2004/0088285 A1 | 5/2004 | Martin et al. |
| 2004/0103017 A1 | 5/2004 | Reed et al. |
| 2004/0109555 A1 | 6/2004 | Williams |
| 2004/0120473 A1 | 6/2004 | Birch et al. |
| 2004/0125937 A1 | 7/2004 | Turcan et al. |
| 2004/0125938 A1 | 7/2004 | Turcan et al. |
| 2004/0125940 A1 | 7/2004 | Turcan et al. |
| 2004/0161078 A1 | 8/2004 | Knott et al. |
| 2004/0161094 A1 | 8/2004 | Martin et al. |
| 2004/0161096 A1 | 8/2004 | Knott et al. |
| 2004/0174980 A1 | 9/2004 | Knott et al. |
| 2004/0230438 A1 | 11/2004 | Pasquale et al. |
| 2004/0240635 A1 | 12/2004 | Bushey et al. |
| 2004/0243568 A1 | 12/2004 | Wang et al. |
| 2004/0259541 A1 | 12/2004 | Hicks, III et al. |
| 2005/0008141 A1 | 1/2005 | Kortum et al. |
| 2005/0015744 A1 | 1/2005 | Bushey et al. |
| 2005/0018825 A1 | 1/2005 | Ho et al. |
| 2005/0027535 A1 | 2/2005 | Martin et al. |
| 2005/0041796 A1 | 2/2005 | Joseph et al. |
| 2005/0047578 A1 | 3/2005 | Knott et al. |
| 2005/0055216 A1 | 3/2005 | Bushey et al. |
| 2005/0058264 A1 | 3/2005 | Joseph et al. |
| 2005/0075894 A1 | 4/2005 | Bushey et al. |
| 2005/0078805 A1 | 4/2005 | Mills et al. |
| 2005/0080630 A1 | 4/2005 | Mills et al. |
| 2005/0080667 A1 | 4/2005 | Knott et al. |
| 2005/0131892 A1 | 6/2005 | Knott et al. |
| 2005/0132262 A1 | 6/2005 | Bushey et al. |
| 2005/0135595 A1 | 6/2005 | Bushey et al. |
| 2005/0141692 A1 | 6/2005 | Scherer et al. |
| 2005/0147218 A1 | 7/2005 | Novack et al. |
| 2005/0161002 A1 | 7/2005 | Robinson |
| 2005/0169441 A1 | 8/2005 | Yacoub et al. |
| 2005/0169453 A1 | 8/2005 | Knott et al. |
| 2005/0201547 A1 | 9/2005 | Burg et al. |
| 2005/0240411 A1 | 10/2005 | Yacoub et al. |
| 2006/0002540 A1 * | 1/2006 | Kreiner et al. ........... 379/265.02 |
| 2006/0026049 A1 | 2/2006 | Joseph et al. |
| 2006/0050865 A1 | 3/2006 | Kortum et al. |
| 2006/0062375 A1 | 3/2006 | Pasquale et al. |
| 2006/0072737 A1 | 4/2006 | Paden et al. |
| 2006/0126808 A1 | 6/2006 | Dallessandro et al. |
| 2006/0126811 A1 | 6/2006 | Bushey et al. |
| 2006/0159116 A1 | 7/2006 | Gerszberg et al. |
| 2006/0177040 A1 | 8/2006 | Mitra et al. |
| 2006/0187954 A1 | 8/2006 | Braschi et al. |
| 2006/0188075 A1 | 8/2006 | Peterson |
| 2006/0188087 A1 | 8/2006 | Kortum et al. |
| 2006/0215833 A1 | 9/2006 | Mahoney et al. |
| 2006/0251094 A1 | 11/2006 | Van Vleck et al. |
| 2006/0251229 A1 | 11/2006 | Gorti |
| 2006/0256932 A1 * | 11/2006 | Bushey et al. ................ 379/67.1 |
| 2006/0291642 A1 | 12/2006 | Bushey et al. |
| 2007/0025542 A1 | 2/2007 | Bushey et al. |
| 2007/0041551 A1 | 2/2007 | Whitecotten et al. |
| 2007/0047718 A1 | 3/2007 | Idler et al. |
| 2007/0047720 A1 | 3/2007 | Brandt et al. |
| 2007/0116230 A1 | 5/2007 | Brandt et al. |
| 2007/0206734 A1 | 9/2007 | Hagale |
| 2007/0260539 A1 | 11/2007 | Delinsky et al. |
| 2008/0048861 A1 | 2/2008 | Naidoo et al. |
| 2008/0049779 A1 | 2/2008 | Hopmann et al. |
| 2008/0154773 A1 | 6/2008 | Ranzini et al. |
| 2009/0019141 A1 | 1/2009 | Bush et al. |
| 2010/0054449 A1 * | 3/2010 | Bushey et al. ............ 379/265.02 |
| 2013/0010947 A1 * | 1/2013 | Bushey et al. ............ 379/265.02 |

* cited by examiner

SYSTEM AND METHOD OF DETERMINING CALL TREATMENT OF REPEAT CALLS

CLAIM OF PRIORITY

The present application claims priority from and is a continuation of U.S. patent application Ser. No. 12/616,248, filed on Nov. 11, 2009 and entitled "SYSTEM AND METHOD OF DETERMINING CALL TREATMENT OF REPEAT CALLS," which claims priority from and is a continuation of U.S. patent application Ser. No. 11/129,051, issued as U.S. Pat. No. 7,636,432, filed on May 13, 2005 and entitled "SYSTEM AND METHOD OF DETERMINING CALL TREATMENT OF REPEAT CALLS," the contents of which are expressly incorporated herein by reference in their entirety.

FIELD OF THE DISCLOSURE

The present disclosure relates generally to call treatment and processing of repeat calls by an automated call processing system.

BACKGROUND

The advent of speech-enabled interactive voice response systems has enabled call center organizations to efficiently deploy automated customer service functions in place of live agents, thereby reducing operational costs. However, this cost savings often comes at the price of reduced efficiency, as a live agent often is more effective at addressing particular types of customer inquiries. The use of an interactive voice response system also may lead to frustration on the part of a repeat caller, i.e., a caller who has called a call center at least twice within a certain time period. The repeat caller may be calling to readdress an issue that was unresolved by a previous call. In such instances, the repeat caller may become agitated when the caller is required to navigate the interactive voice response system for a second time rather than addressing the caller's issue directly with a live agent. Alternatively, the repeat caller may be calling again to obtain information and may not expect to receive the assistance of a live agent. For example, the repeat call could be to obtain a bill payment amount that the caller obtained previously but has since misplaced. In such instances, the use of a live agent to assist the repeat caller typically is an inefficient utilization of the live agent as the caller likely would have obtained the same information at a lower cost using an interactive voice response system.

DETAILED DESCRIPTION OF THE DRAWINGS

Figure 1:
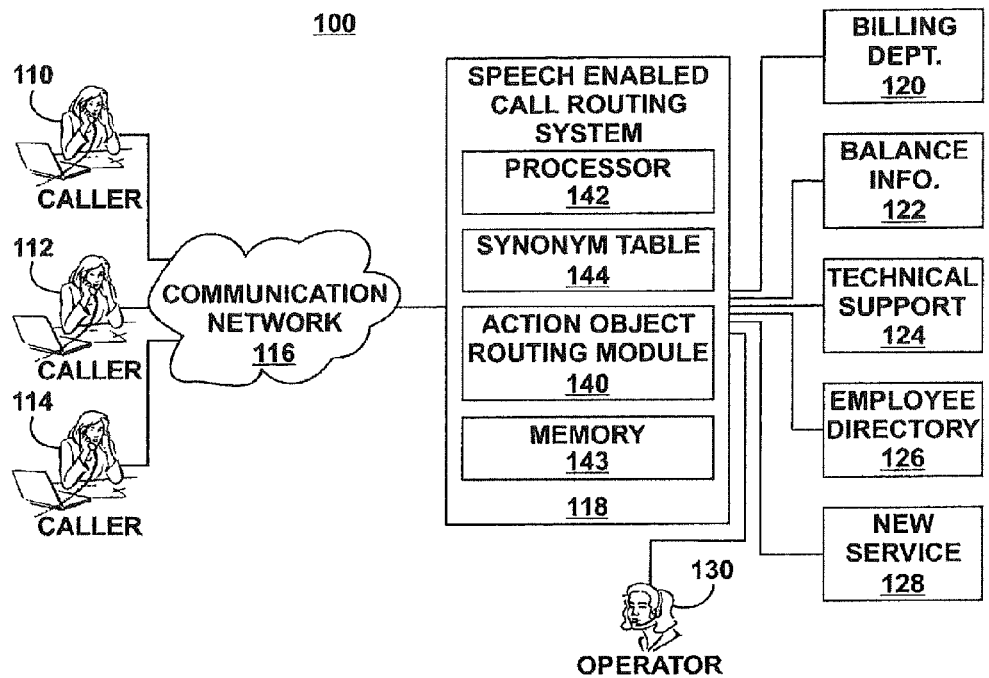
FIG. 1 is a general diagram of a communication system.

A call received at a call center is determined to be a repeat call. The repeat call is evaluated to determine whether the repeat call is to receive a first treatment type. The repeat call is serviced with the first treatment type when the repeat call is determined to receive the first treatment type. The repeat call is serviced with a second treatment type when the repeat call is determined to not receive the first treatment type. The second treatment type includes providing access to a self-service automated system.

In a particular embodiment, a computer implemented method includes determining that a call received at a call center is a repeat call. The computer implemented method includes determining whether the repeat call is to receive a first treatment type. The computer implemented method also includes servicing the repeat call with the first treatment type when the repeat call is determined to receive the first treatment type. The computer implemented method further includes servicing the repeat call with a second treatment type when the repeat call is determined to not receive the first treatment type. The second treatment type includes providing access to a self-service automated system.

In another particular embodiment, a system includes a processor and a memory accessible to the processor. The memory includes operational instructions that, when executed by the processor, cause the processor to determine whether a call received at the call center is a repeat call. The memory includes operational instructions that, when executed by the processor, cause the processor to determine whether the repeat call is to receive a first treatment type. The memory also includes operational instructions that, when executed by the processor, cause the processor to service the repeat call with the first treatment type when the repeat call is determined to receive the first treatment type. The memory further includes operational instructions that, when executed by the processor, cause the processor to service the repeat call with a second treatment type when the repeat call is determined to not receive the first treatment type. The second treatment type includes providing access to a self-service automated system.

In another particular embodiment, a computer-readable storage medium comprising operational instructions that, when executed by a processor, cause the processor to determine that a call received at a call center is a repeat call based on a threshold time period. The operational instructions are further executable by the processor to determine whether the repeat call is to receive a first treatment type. The operational instructions are further executable by the processor to service the repeat call with the first treatment type when the repeat call is determined to receive the first treatment type. The operational instructions are further executable by the processor to service the repeat call with a second treatment type when the repeat call is determined to not receive the first treatment type, wherein the second treatment type includes providing access to a self-service automated system.

Referring to FIG. 1, an illustrated embodiment of a communications system 100 that includes a call routing support system is shown. The communications system 100 includes a speech-enabled call routing system (SECRS) 118, such as an interactive voice response system having a speech recognition module. The communications system 100 also includes a plurality of potential call destinations. Illustrative call destinations shown include service departments, such as a billing department 120, a balance information department 122, a technical support department 124, an employee directory department 126, and new service department 128. In practice, a communications network 116 may receive calls from a variety of callers, such as the illustrated callers 110, 112, and 114. In a particular embodiment, the communications network 116 may be a public telephone network, a wireless telephone network, a voice over Internet protocol (VoIP)-type network, or other network capable of supporting communications. As depicted, the SECRS 118 may include a processor 142, a memory 143, a synonym table 144, and an action-object routing module 140. Depending upon implementation, the SECRS 118 may be coupled to and may route calls to various destinations across a local area network (LAN), a wide area network (WAN), an Intranet, an extranet, the public Internet, and/or other communications link or networks, as shown.

Additionally, the SECRS 118 may route calls to an agent, such as the illustrated live operator 130. An illustrative embodiment of the SECRS 118 may be a call center having a plurality of agent terminals attached. Thus, while only a single operator 130 is shown in FIG. 1, it should be understood that a plurality of different agent terminals or types of terminals may be coupled to the SECRS 118, such that a variety of agents may service incoming calls. Moreover, the SECRS 118 may be operable as an automated call routing system.

Figure 2:
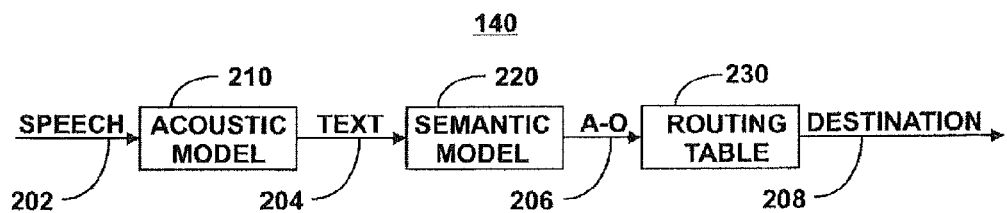
FIG. 2 is a general block diagram that illustrates call processing.

Referring to FIG. 2, an illustrative block diagram of the action-object routing module 140 as implemented by the processor 142 is depicted. As shown, the action-object routing module 140 may include an acoustic processing model 210, a semantic processing model 220, and an action-object routing table 230. The acoustic model 210 receives speech input 202 (provided by a caller) and provides a corresponding text output 204. The semantic model 220 receives text output 204 directly or indirectly from the acoustic model 210 and produces an action-object table 206 containing salient terms of the speech input 202. In a particular embodiment, the one or more actions and objects in the action-object table 206 may be ordered or ranked according to a confidence level. The confidence level may be used to indicate how likely a given action or object reflects a correct and useable customer instruction.

The action-object routing module 140 employs the action-object routing table 230 to identify a call routing destination 208 based on matching between the action-object pairs of the action-object table 206 to corresponding call routing destination entries of the routing table 230. In a particular embodiment, the action-object routing table 230 may be implemented as a lookup table or a spreadsheet, such as a Microsoft Excel™ spreadsheet. A call received at a call routing network may be routed to the appropriate destination as identified by the call routing destination 208, such as the billing department 120 or the technical support service department 124 depicted in FIG. 1.

Figure 3:
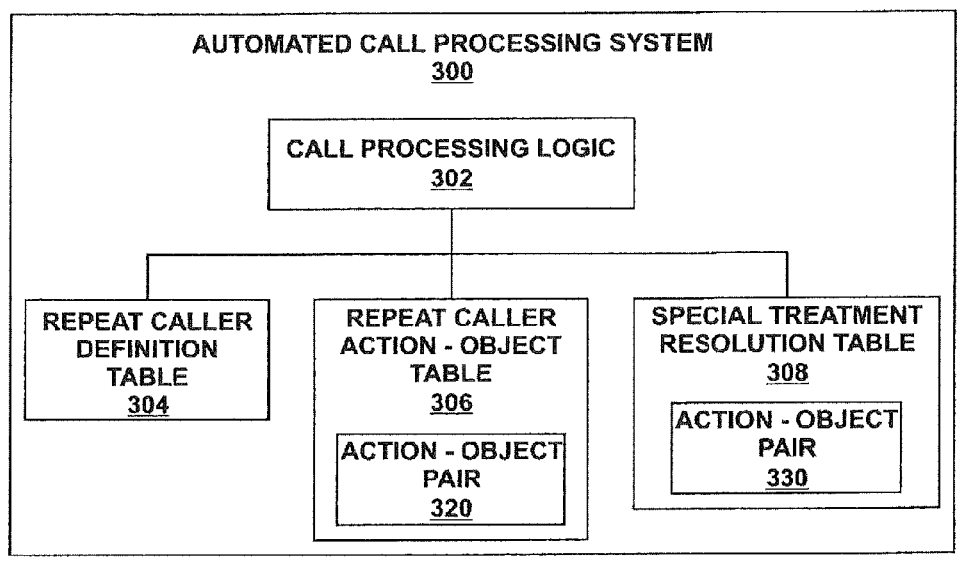
FIG. 3 is a general diagram that illustrates an automated call processing system within the communication system of FIG. 1.

Referring to FIG. 3, a particular embodiment of the automated call processing system 300 is illustrated. As shown, the system 300 may include call processing logic 302, a repeat caller definition table 304, a repeat caller action-object table 306 and a special treatment resolution table 308. The repeat caller action-object table 306 includes a plurality of action-object pairs 320. Similarly, the special treatment resolution table 308 includes a plurality of action-object pairs 330.

In a particular embodiment, the repeat caller definition table 304, the repeat caller action-object table 306, and the special treatment resolution table 308 are each implemented as data stored within a computer readable memory. In a particular embodiment, a single computer readable memory may store all of these tables, but in another embodiment separate memory devices may be used to store each of the illustrated tables. Examples of computer readable memory include, but are not limited to, random access memory (RAM), flash memory, cache, hard disk storage, and the like. Further, in one embodiment, the call processing logic 302 is implemented as a software program for use by a computer processing device.

During operation, the automated call processing system 300 activates program logic within the call processing logic unit 302. The call processing logic 302 accesses data from the repeat call definition table 304 to identify a repeat call request. The call processing logic 302 also accesses the action-object table 306 and the special treatment resolution table 308 to determine whether the identified repeat call is to be serviced using a first treatment type (e.g., special treatment) rather than a second treatment type (e.g., standard treatment). Special treatment of a call may include, for example, routing the call to a live agent, whereas the standard treatment may include, for example, forward the call to an automated self-service system. As noted herein, in one embodiment, repeat calls having certain attributes are serviced using the first treatment type, whereas other calls typically are serviced using the second treatment type.

The repeat caller action-object table 306 is accessed by the call processing logic 302 to retrieve specific action-object pairs 320 associated with a call. The specific action-object pairs 320 retrieved from the action-object table 306 may be used as an index to one or more action-object pairs 330 within the special treatment resolution table 308. In a particular embodiment, a first action-object pair 320 corresponds to the repeat call that was received at the automated call processing system 300. A second action-object pair 320 within the action-object pair table 306 corresponds to an action-object pair for a previously received call. A third action-object pair 320 within the action-object table 306 corresponds to a related action-object pair corresponding to the prior call. The call processing logic 302, upon receipt of the action-object pairs 320 from the repeat caller action-object pair table 306 and the special treatment information from special treatment resolution table 308, compares the action-object pair retrieved from the action-object table 306 corresponding to a repeat call to the second action-object pair that corresponds to the prior call. The prior call and the repeat call are identified as being originated by a common caller. In addition, the call processing logic module 302 determines whether the repeat call is identified as associated with an unresolved issue of the caller that would warrant servicing the call with a first treatment type (e.g., special treatment) based on the indexed action-object pair 330 obtained from the special treatment resolution table 308, where the action-object pair 330 indicates whether the corresponding action-object pair 320 of the repeat call is to receive a particular treatment type, such as, for example, special treatment or standard treatment. The call processing system then routes the repeat call to the appropriate destination based on the indicated treatment.

Figure 4:
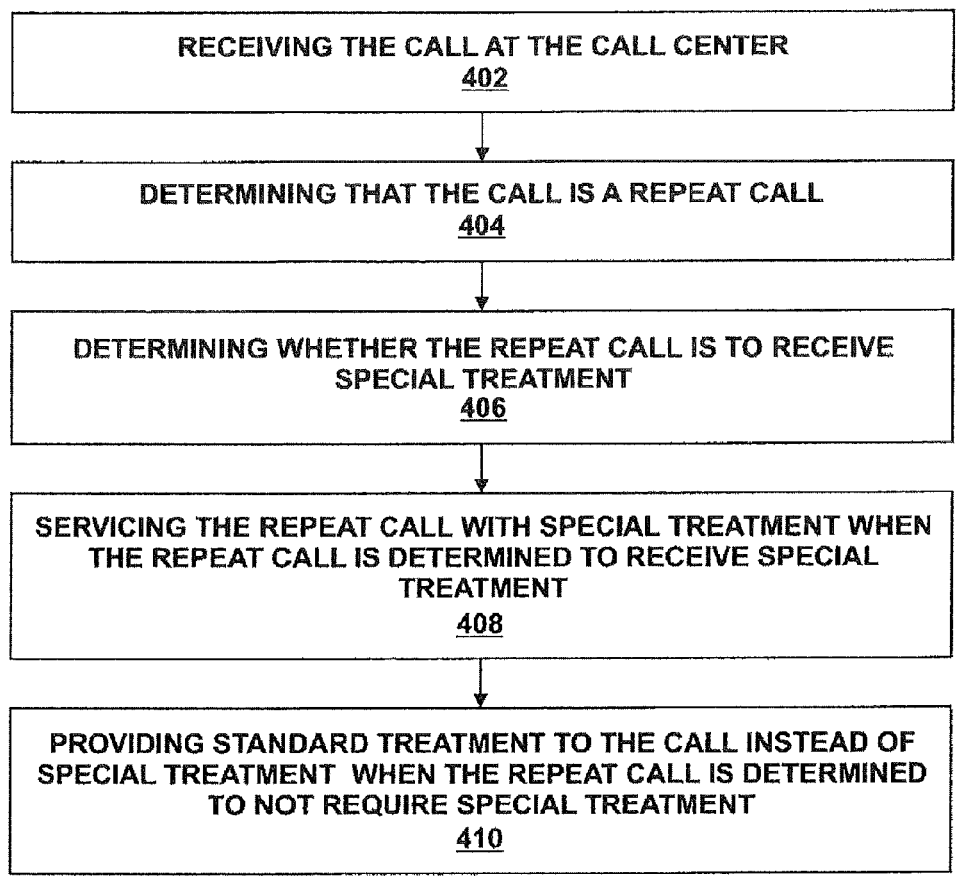
FIGS. 4 and 5 are flow charts that illustrate methods of handling calls at the automated call processing system of FIG. 3.

Referring to FIG. 4, a particular embodiment of a method of handling a call received at a call center, such as a call received at the automated call processing system 300, is shown. The method includes receiving a call at the call center at 402. The method further includes determining that the call is a repeat call at 404 and determining whether the repeat call is to receive a first treatment type (e.g., special treatment) at 406. An example of the first treatment type as special treatment includes routing a caller to a live agent instead of to a self-service software system. In a particular embodiment, the determination of whether the call is to receive the first treatment type is based on an action-object pair associated with the repeat call. The action-object pair characterizes the caller request and may be used to determine whether a particular call is a repeat call and/or whether the repeat call is to receive the first treatment type treatment. An example of action-object pairs in an action-object pair table that may be used to determine whether a call is a repeat call or to determine whether a call is to receive the first treatment type is shown below in tables 1 and 2.

TABLE 1

Example of a portion of "Time Periods Defining Repeat Caller"

| Segment | CA Repeat Caller within # of Days | NV Repeat Caller within # of Days | OK Repeat Caller within # of Days | TX Repeat Caller within # of Days |
|---|---|---|---|---|
| Complex | 45 | 45 | 45 | 45 |
| Growth | 30 | 30 | 30 | 30 |
| Value | 7 | 7 | 7 | 7 |
| Basic | 7 | 7 | 7 | 7 |
| Other | 0 | 0 | 0 | 0 |

TABLE 2

Example of a portion of "Repeat Caller Action-Objects"

| Action Objects | Repeat Logic | Related AO 1 | Related AO 2 |
|---|---|---|---|
| Acquire-Basic | Y | Acquire-Basic_DFLT | Null |
| Acquire-Basic_DFLT | Y | Acquire-Basic | Null |
| Acquire-Cingular | Y | \|Vague-CingularGroup_DFLT\| | Inquire-Cingular |
| Acquire-Dish | Y | Null | Null |
| Acquire-DSL | Y | Null | Null |
| Acquire-LD | Y | Null | Null |
| Acquire-NamedServiceAgent | Y | Null | Null |
| Acquire-NamedServiceSystem | Y | Null | Null |
| Acquire-Service_DFLT | N | Null | Null |
| Acquire-Service_ServiceName_DFLT | Y | Null | Null |
| Acquire-Winback | Y | Null | Null |
| AskAction-Complaint_DFLT | Y | Null | Null |
| AskAction-Service_DFLT | Y | Null | Null |
| Cancel-Basic | Y | Null | Null |
| Cancel-Dish | N | Null | Null |

The method further includes servicing the repeat call with, for example, a special treatment when the repeat call is determined to receive the first treatment type, at 408. For example, where a repeat call is associated with receipt of special treatment, that repeat call is routed to a live agent to address a caller's problem using a human agent. In this manner, repeat callers that are identified to receive special treatment are provided increased resources, such as the live agent, to assist the caller with an unresolved problem. The method further includes providing, for example, standard treatment to the call instead of special treatment when the call is determined to not require the first treatment type, or to require a second treatment type, at 410.

Figure 5:
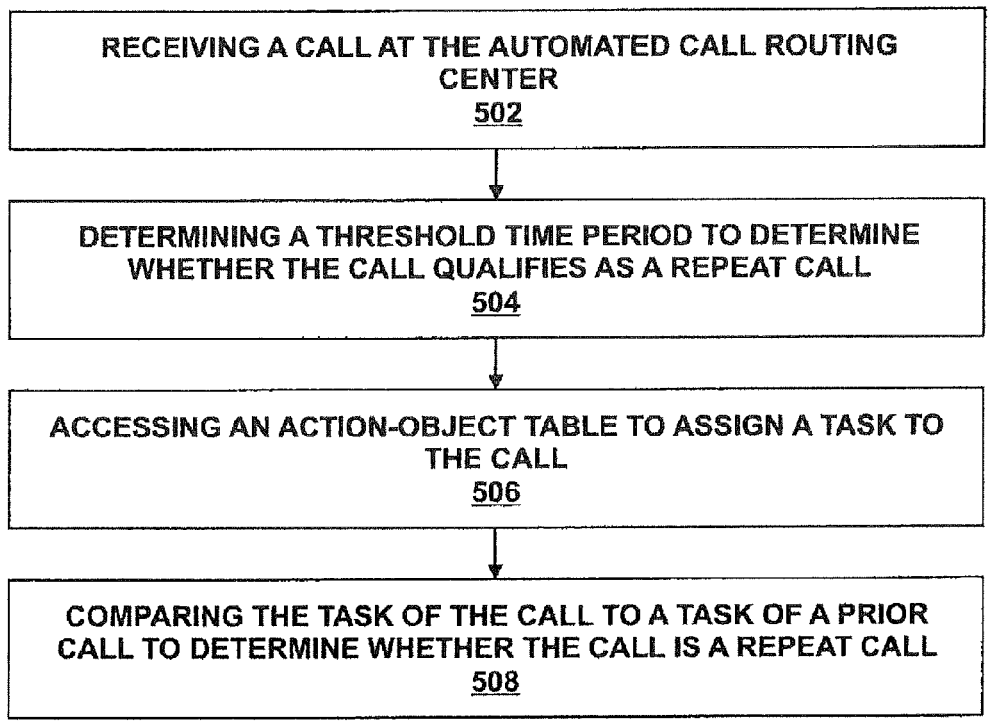

Referring to FIG. 5, a particular embodiment of a method of handling a call received at an automated call routing system is shown. The method includes receiving a call at the automated call routing system at 502 and determining a threshold time period to determine whether the call qualifies as a repeat call at 504. The method further includes accessing an action-object table to assign a task to the call at 506 and comparing the task of the call to the task of a prior call to determine whether the call is a repeat call at 508.

In a particular embodiment, the method includes comparing an action-object pair of the call to an action-object pair that is related to a prior call to determine whether the call is a repeat call. In a particular illustrative embodiment, the threshold time period is a specified number of days.

Also, in a particular embodiment, the task provided by the caller is determined in connection with a purpose of a call inquiry received at the automated call routing system. The task may be defined by a particular action-object pair assigned to the call. When the call is determined to be a repeat call, the method may determine whether the repeat call is to be serviced with a first treatment type or a second treatment type based on the determined task of the call. An example of the second treatment type includes standard treatment, such as routing the call to a self-service system. An example of the first treatment type includes special treatment, such as routing the call to a live agent terminal at a call handling center.

With the disclosed system and method, a call center organization may use and identify tasks of a particular call to determine whether to resolve a caller's request using self-service automation, which is less expensive, or to route the call to a live agent for greater attention and a personal touch. The disclosed task-dependent repeat call handling system and method is an improvement over the conventional approach in which repeat callers are handled the same way and either all callers are routed to a live agent or to a common self-service system. The disclosed system and method thereby provides enhanced service to select repeat callers having unresolved issues that need immediate attention. Such callers are connected with a call center agent to receive special treatment.

In a particular illustrative embodiment, the method of determining a repeat caller and determining a call treatment may include performing a look-up in a repeat caller definition table for a particular number of days where the call is determined to be a repeat call. If the call is received within the time period then a repeat call flag may be set to 'yes'. The caller provides a task via a purpose of call field within an enterprise automated call routing system and an action-object pair is assigned to that call based on the task. A table look-up is then made in the repeat caller action-object table to determine if the caller's current action-object matches the action-object from their previous call. If the action-object pairs match then repeat call logic may be identified as active. Also, the action-object pair for the detected call may be compared to a special treatment resolution table to determine how to resolve a particular action-object. For example, where the previous action-object is equal to the detected action-object or where the previous action-object is related to the current action-object, then the caller may be detected as a repeat caller and the caller's task may be subsequently determined to be an unresolved issue. If a repeat caller is identified as having an unresolved issue then the call is routed to a live agent for special treatment as determined by the special treatment resolution table. However, where the call is not a repeat call or where the repeat call is not identified with an unresolved issue, then the call is not provided the special treatment and is routed in the standard manner.

While the disclosed system is described with respect to action-object technology, it should be understood that the system and method disclosed is suitable with alternative call center systems. In addition, the disclosed system and method provides an improved technique to handle repeat callers by allocating live agent resources for those callers likely to have unresolved issues, while efficiently and cost effectively applying self-service system technology for those callers likely to have less urgent needs. Thus, the disclosed system and method may reduce the number of repeat callers handled by a live agent and save significant costs on a per call basis. Such cost considerations are increasingly important as call centers handle larger and larger call volumes.

The above disclosed subject matter is to be considered illustrative, and not restrictive, and the appended claims are intended to cover all such modifications, enhancements, and other embodiments which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   retrieving first data associated with a call from an action-object table based on speech input received via the call;
   retrieving second data from a resolution table based on the first data, wherein the second data indicates a treatment type to be provided to the call; and
   in response to determining that the treatment type indicates a particular treatment type, servicing the call with the particular treatment type, wherein the particular treatment type includes routing the call to a destination associated with a call center.

2. The method of claim 1, wherein the destination includes a billing department, a balance information department, a technical support department, an employee directory department, or a new service department.

3. The method of claim 1, further comprising, in response to determining that the treatment type does not indicate the particular treatment type, servicing the call with a second particular treatment type, wherein the second particular treatment type includes providing access to a self-service automated system.

4. The method of claim 3, wherein the particular treatment type is distinct from the second particular treatment type.

5. The method of claim 1, wherein the particular treatment type includes providing access to a live agent associated with the destination.

6. The method of claim 1, wherein the resolution table includes a plurality of action-object pair entries, each of the action-object pair entries indicating one of a plurality of treatment types, and wherein none of the plurality of treatment types includes providing access to a self-service automated system.

7. The method of claim 1, wherein the treatment type indicates the particular treatment type when the call is associated with an unresolved issue of a caller.

8. The method of claim 1, further comprising determining that the call is a repeat call based on the first data.

9. The method of claim 1, further comprising determining whether the call is a repeat call based on a comparison of a first action-object pair of the first data to a second action-object pair of the second data, wherein the first action-object pair is associated with the call and the second action-object pair is associated with a prior call.

10. The method of claim 9, further comprising assigning a task to the call based on determining that the call is a repeat call, wherein the task indicates that the call is associated with an unresolved issue of a caller associated with the call.

11. The method of claim 9, wherein the second data is accessed from the resolution table based on the first data in response to determining that the call is a repeat call.

12. A system comprising:
    a processor; and
    a memory accessible to the processor, the memory including instructions that, when executed by the processor, cause the processor to perform operations comprising:
        retrieving first data associated with a call from an action-object table based on speech input received via the call;
        retrieving second data from a resolution table based on the first data, wherein the second data indicates a treatment type to be provided to the call; and
        in response to determining that the treatment type indicates a particular treatment type, servicing the call with the particular treatment type, wherein the particular treatment type includes routing the call to a destination associated with a call center.

13. The system of claim 12, wherein the operations further comprise, in response to determining that the treatment type does not indicate the particular treatment type, servicing the call with a second particular treatment type, and wherein the second particular treatment type includes providing access to a self-service automated system.

14. The system of claim 12, wherein, when the treatment type indicates the particular treatment type, the call is associated with an unresolved issue of a caller associated with the call.

15. The system of claim 12, wherein the operations further comprise:
    assigning a particular task to the call based on the first data; and
    comparing the particular task to a task of a prior call to determine whether the call is a repeat call.

16. The system of claim 12, wherein the second data is retrieved from the resolution table based on the first data in response to determining that the call is a repeat call.

17. The system of claim 12, wherein the action-object table includes a plurality of action-object pairs, wherein the first data includes an action-object pair, wherein the second data is retrieved from the resolution table using an index, and wherein the action-object pair is the index.

18. The system of claim 12, wherein the operations further comprise receiving task-identification information from a caller that initiated the call.

19. A computer-readable storage device comprising instructions that, when executed by a processor, cause the processor to perform operations comprising:
    retrieving first data associated with a call from an action-object table based on speech input received via the call;
    retrieving second data from a resolution table based on the first data, wherein the second data indicates a treatment type to be provided to the call; and
    in response to determining that the treatment type indicates a particular treatment type, servicing the call with the particular treatment type, wherein the particular treatment type includes routing the call to a destination associated with a call center.

20. The computer-readable storage device of claim 19, wherein the operations further comprise, in response to determining that the treatment type does not indicate the particular treatment type, servicing the call with a second particular treatment type, and wherein the second particular treatment type includes providing access to a self-service automated system.

* * * * *